Sept. 20, 1966  E. B. POOL ETAL  3,273,853
COMPOSITE METAL-RUBBER INSERT FOR GATE VALVE
Filed Nov. 27, 1963  2 Sheets-Sheet 1

INVENTORS
ELDERT B. POOL
JOSEPH R. KERTIS
JAMES A. HOLLINGSWORTH
BY Strauch, Nolan & Neale
ATTORNEYS

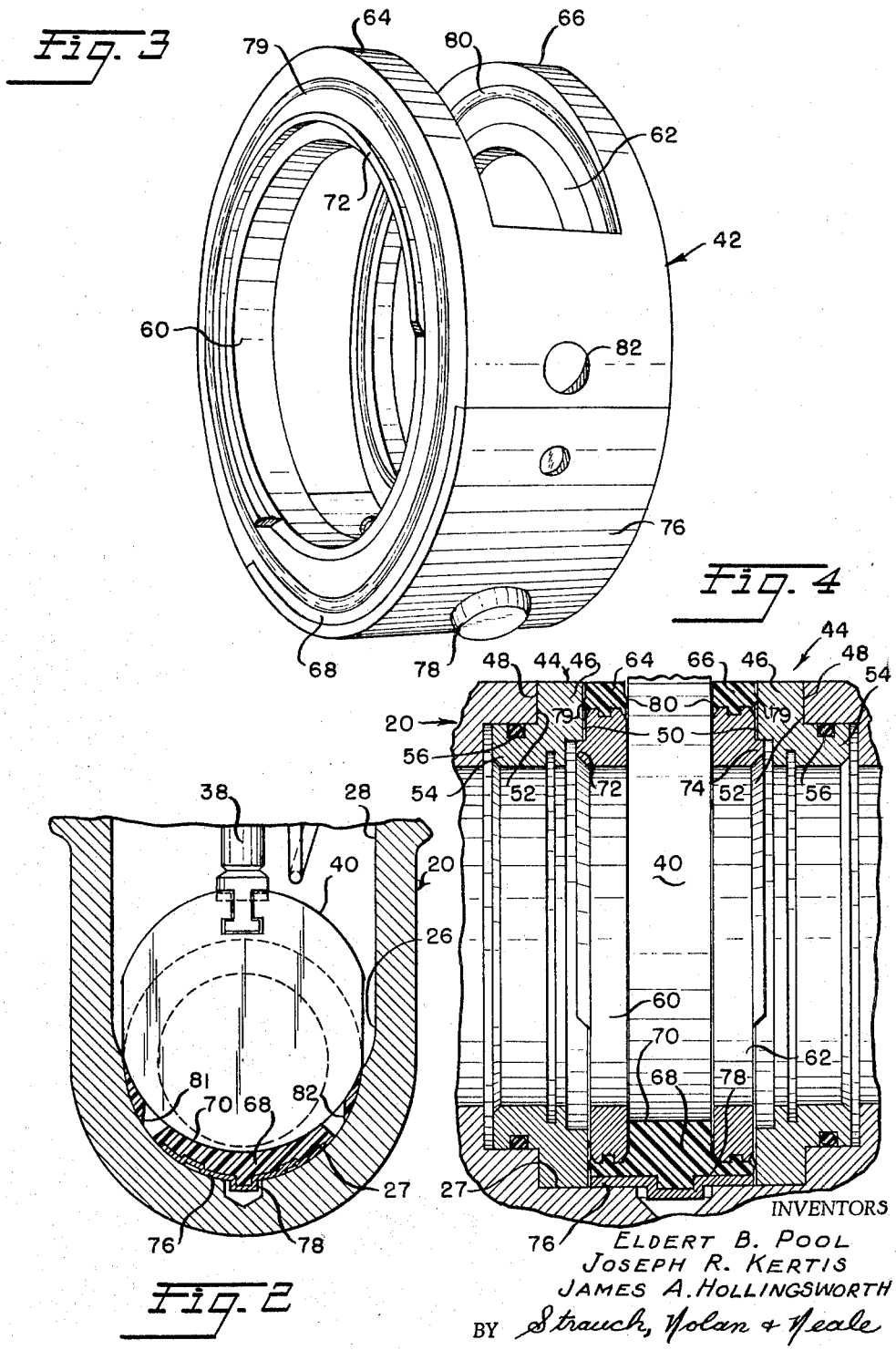

3,273,853
COMPOSITE METAL-RUBBER INSERT FOR GATE VALVE
Eldert B. Pool, Palos Park, Ill., and Joseph R. Kertis, Hammond, and James A. Hollingsworth, Gary, Ind., assignors to Rockwell Manufacturing Company, Pittsburgh, Pa., a corporation of Pennsylvania
Filed Nov. 27, 1963, Ser. No. 326,426
3 Claims. (Cl. 251—175)

This invention relates to valves and more particularly to resilient seated gate valves adapted primarily for handling abrasive laden fluids, such as drilling mud.

Valves of the type with which this invention is concerned must be capable of providing, reliably and repeatedly, drop tight sealing under high or low pressures despite the presence of highly abrasive or erosive subtances in the fluid being handled.

Further, it is an important requirement, particularly in installations such as drilling rigs, that the wear, which is inevitable in valves exposed to such rigorous service, be confined to replaceable parts and that the valve be so constructed as to permit replacement of these parts in the field without breaking the line in which the valve is installed.

It is, of course, also necessary that the replaceable parts be exceptionally strong and wear resistant and that the construction of the entire valve be such that these parts are protected from damage to extend the effective service life of the replaceable parts.

One prior valve construction which is adapted for service of this type and which has been widely accepted in the field is disclosed and claimed in United States Patent 3,071,343 granted January 1, 1963 for Valve for High Pressure Abrasive Carrying Fluids. This valve includes a one-piece composite metal-rubber insert which is received in the valve body between opposed parallel surfaces formed integrally with the valve body at the inner ends of the flow passages. The resilient portion of the insert is reinforced by a pair of metal rings forming a portion of the flow passage and by a metal plate bonded to the lower portion of the periphery of the insert.

However, it has been discovered that when this valve is operated under severe conditions or for an extended period of time the faces of the valve body which support the insert are subject to abrasion or erosion which may eventually require replacement of the entire valve body, an expensive and time consuming operation.

To correct this problem it has been proposed to incorporate in a valve of this type, separate removable wear rings positioned at the inner ends of the flow passages between the valve body and the opposite sides of the removable composite sealing insert. However, experience demonstrated that incorporation of such wear rings in the valve of Patent 3,071,343 materially decreased the life of the replaceable sealing insert. More specifically, it was found that a substantial number of the valves so equipped failed prematurely because of bending or other damage to the metal plate or shell provided at the outer surface of the bottom of the insert and the advantage of the addiional protection afforded to the surfaces of the valve body was essentially nullified.

With these considerations in mind, it is a principal purpose and object of the present invention to provide improved valve constructions of the type referred to above including novel replaceable internal components which have an extended service life and which afford complete protection to the valve body.

It is a further object of the present invention to provide improved valves for handling abrasive laden fluids which are effective to provide, over extended periods of time, a drop tight seal under pressures varying from zero to several thousand pounds per sq. inch despite the presence of highly abrasive or erosive materials in the fluid being handled.

It is also an object of the present invention to provide improved resilient seated gate valves including a novel replaceable composite metal-elastomer sealing insert having novel means for protecting the insert from damage particularly during opening movements of the valve.

Additional objects and advantages of the present invention will become apparent as the description proceeds in connection with the accompanying drawings in which:

FIGURE 2 is a fragmentary vertical section taken along line 2—2 of FIGURE 1;

FIGURE 3 is a perspective view of the sealing insert of the present invention; and FIGURE 4 is an enlarged fragmentary view of a portion of the structure shown in FIGURE 1.

Figure 1:
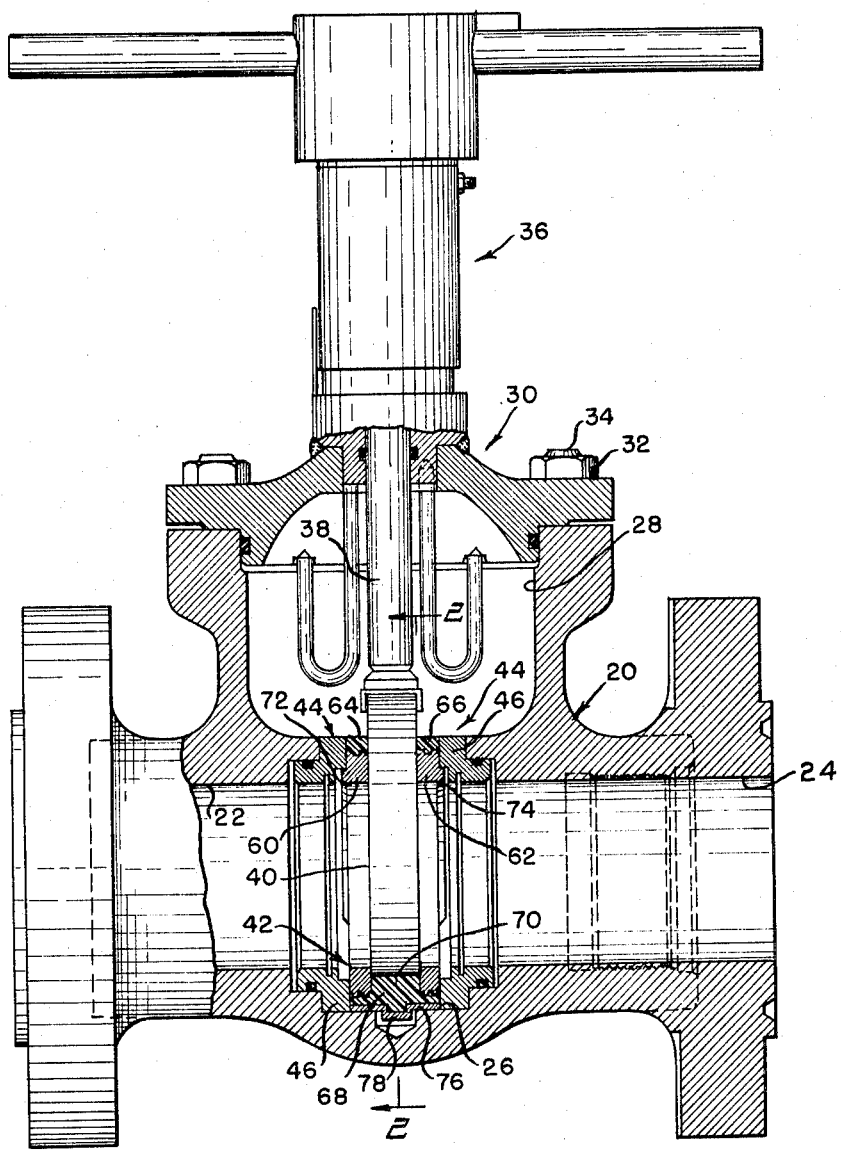
FIGURE 1 is a front elevation of a valve embodying the present invention with parts broken away to show interior details of construction.

Referring now more particularly to the drawings, the embodiment of the invention illustrated herein is a gate valve of the general type disclosed in the aforesaid Patent 3,071,343. The valve comprises a body 20 preferably of one-piece construction having two flow passages 22 and 24 which communicate at their inner ends with an enlarged cavity 26, the lower surface 27 of which is semicylindrical. At its upper end the cavity 26 opens into an enlarged chamber 28 which is closed by a bonnet assembly 30 detachably held in place by nuts 32 threaded onto studs 34.

The bonnet assembly 30 includes a stem operator assembly 36, which is preferably of the same construction as that shown in U.S. Patent 3,071,343 to which reference may be made for details of construction. The operator assembly 36 is effective to raise and lower a stem 38 which carries a laterally floating valve gate 40 to move the gate into and out of sealing relation with the novel resilient sealing insert assembly indicated generally at 42 described in detail below.

Interposed between the opposite sides of the insert assembly 42 and the adjacent valve body surfaces are a pair of identical replaceable wear ring assemblies 44. The wear ring assemblies 44 each comprise a radially extending body 46 having parallel radial faces 48 and 50, the former abutting a radial face 52 surrounding the inner end of the flow passage 22 or 24 and the latter abutting a radial face on the side of the sealing insert 42. The ring assemblies 44 are also each provided with an axial extension 54 carrying a resilient sealing ring 56 in sealing engagement with a counterbore 58 formed in the valve body.

The unitary sealing insert assembly 42 as stated above is of composite construction and comprises a pair of metal reinforcing and wear rings 60 and 62 to which is permanently bonded a resilient sealing structure made of elastomeric material such as Viton-A, Buna-N or butyl compounds and having a hardness in a typical case of approximately 70 to 80 durometer. The resilient portion of the sealing insert comprises a pair of ring portions 64 and 66, the lower ends of which are connected by an integral bridge portion 68 having an upper arcuate surface 70 adapted to be sealingly engaged by the arcuate lower surface of the gate 40. As shown in FIGURE 2 the outer periphery of the insert assembly is formed on essentially the same radius as the valve body cavity so as to fit snugly therein. The parts are also proportioned so the inner surfaces of the rings 60 and 62 are formed on the same radius as the inner surfaces of the replaceable wear ring assemblies 44 and thus form continuations of the flow passages 22 and 24.

The insert assembly 42 and the wear ring assemblies 44 mutually cooperate to position the parts properly and hold them in proper position during operation of the valve. More specifically, the insert assembly 42 is retained in place by outwardly projecting ridges 72 and 74 which extend around the upper portion of the reinforcing rings 60 and 62, respectively, and are received in counterbores in the wear ring assemblies 44.

Around the lower peripheral portion the insert assembly is provided with a metal reinforcing plate or lock shell 76 which is bonded to the bridge and which extends entirely across the space between the lower portions of the wear rings 44 to hold these portions of the ring in firm engagement with the adjacent radial body surfaces 52. Adjacent its midpoint the lock shell is provided with a circular projection 78 received in a mating recess in the bottom of the valve cavity to prevent rotation of the insert in use.

The gate and stem operator are so proportioned that when the gate is in its uppermost position it extends between the upper portions of the reinforcing rings 60 and 62 to retain the ridges 72 and 74 in their respective counterbores thus preventing accidental dislodgement of the insert assembly. However, when the bonnet is removed, carrying with it the stem and gate, the upper portions of the insert assembly may be squeezed together to release the ridges 72 and 74 and the insert may be withdrawn through the chamber 28 permitting subsequent removal of the wear rings 44 thus permitting the replacement of these parts in a matter of minutes.

The radial faces of the ring portions 64 and 66 of the sealing insert are provided with laterally projecting ridges 79 and 80, the former sealingly engaging the adjacent surfaces of the wear rings 44 and the latter sealingly engaging the side surfaces of the gate 40. The parts are so dimensioned that when the gate is moved to closed position as shown in FIGURE 1 in the absence of fluid pressure differential the ridges 79 and 80 on each of the ring portions 64 and 66 are distorted sufficiently to form a drop tight seal.

The sealing action of the valve is much the same as that described in detail in Patent 3,071,343. The valve is fully reversible and either the flow passage 22 or the flow passage 24 may be considered the high pressure side of the valve. If the flow passage 24 is connected to a source of fluid under pressure, for example 3,000 p.s.i., and the flow passage 22 is vented, the gate 40 will be urged to the left as viewed in FIGURE 1, the movement of the gate in this direction progressing until the side face of the gate comes to rest against the inner face of the metal reinforcing ring 60 thus providing metal-to-metal support of the downstream side of the gate. When the gate reaches this position, the downstream sealing ridges 79 and 80 disappear. A primary seal is formed between the adjacent metal surfaces and a secondary seal is provided by the metal-elastomer interfaces. A seal is also formed between the lower surface of the gate and the upper surface 70 of the resilient bridge portion. Because of the downstream movement of the gate under differential pressure, the initial seal formed at the upstream side of the gate may be broken permitting fluid to leak into the bonnet cavity to augment the sealing effectiveness of the structure at the downstream side of the gate.

It has been found that while the structure thus far described provides an effective seal over a pressure range from zero to several thousand p.s.i., nevertheless, it is subject to damage during the opening movement of the gate. More specifically it has been established by actual experience that as the gate 40 is raised to open the valve, the lock shell and the bridge portion of the sealing insert tend to follow the gate during the initial portion of the travel of the gate. The undesirable displacement of the parts may continue until the lock shell is permanently bent or until the elastomeric bridge breaks loose from the lock shell, either result substantially destroying the sealing effectiveness of the structure. Attempts to correct this difficulty by increasing the strength of the lock shell were unsuccessful.

This problem was ultimately solved by the provision of a pair of openings 81 and 82 extending through the bridge portion of the insert beyond the opposite ends of the lock shell 76.

In a typical case where the over all diameter of the sealing insert is approximately 3″ and its width is approximately 1⅝″ the two openings 81 and 82 are ¼″ in diameter at their outer ends where they are circular and are of increasing size as they progress radially inwardly terminating at their inner ends in openings of elliptical form having a dimension along their major axes of approximately ⅜″. Actual testing and field experience have established that the provision of these openings has completely eliminated the problem of damage to the insert. It is to be understood however, that the dimensions of the openings may be varied to some extent and if desired they may be cylindrical from end to end without destroying their intended effect.

It is believed that the reasons for the surprising performance achieved by the lock shell having the openings 81 and 82 may be explained as follows. When the gate is fully closed under the conditions described above, i.e., with the passage 24 connected to a source of fluid under pressure, for example at 3000 p.s.i., and the flow passage 22 being vented or connected to a region of substantially lower pressure, a seal is defined between the resilient bridge and the adjacent radial face 50 of the downstream wear ring 44. Primary metal-to-metal seals are also formed between the radial face of the downstream reinforcing ring 60 and the adjacent radial face 50 of the downstream wear ring and between the opposite radial face of the downstream reinforcing ring 60 and the adjacent surface of the gate. Finally a seal is formed between the bottom surface of the gate and the upper surface 70 of the resilient bridge portion of the insert. At the same time substantially full line pressure exists in the region between the bottom peripheral portion of the insert and the adjacent surface of the bottom of the valve cavity. Thus, when the gate is initially moved away from fully closed position the pressure differential acting upwardly across the bridge is substantially the guage line pressure. As the gate moves upwardly as the opening movement is continued, the pressure differential across the bridge tends to push the bridge and the lock shell upwardly to follow the upward movement of the gate. In the absence of the openings 81 and 82 this movement may continue until the primary metal-to-metal seal is broken when the bottom edge of the gate rises above the inner edge of the downstream reinforcing ring 60. The outer edges of the lock shell 76 do not move as readily as the central portion of the lock shell because of the resistance of the confined section of elastomer between the reinforcing rings 60 and 62 and the outer edge portions of the lock shell. The central section, however, is relatively free to move and this movement causes the lock shell to bend with the result that the valve cannot be resealed. This action is prevented by the openings 81 and 82 which effectively vent the gate-bridge interface and break the seal between the bottom surface of the gate and the upper arcuate surface 70 of the bridge quickly upon upward movement of the gate. Thus, the pressure will be equalized on both faces of the bridge, eliminating the pressure differential across the bridge and thus eliminating the otherwise destructive forces.

The present invention thus provides a substantial improvement over prior devices by providing a valve construction which retards wear and confines it to three easily replaced parts, the gate, the seat insert, and the body wear rings. By replacing these relatively inexpensive parts the valve of the present invention can be put in "as new" condition in minutes while the valve is still on the line. Many prior gate valves, although specifically developed for rigorous service, such as service on mud lines, require replacement in six months because of the presence of erosion in the valve body severe enough to make repairs impossible. The improved valves of the present invention have been welded into mud lines because they are expected to last the life of the system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve comprising a body having flow passages intersecting at their inner ends an enlarged central cavity, a flow controlling gate movable into and out of said cavity between closed and opened positions, removable annular wear rings carried by said body at the inner ends of said flow passages, a resilient sealing insert removably mounted in said cavity between said wear rings, said insert having a resilient bridge portion, a metallic reinforcement member bonded to the outer surface of said bridge portion and adapted to engage a bottom wall of said cavity, said reinforcement member extending completely across said cavity between said wear rings to hold said wear rings in position, said bridge portion having an upper surface against which said gate seals when said gate is moved to closed position, and means on said bridge for breaking the seal between said gate and the adjacent surface of said bridge when said gate is initially moved towards open position.

2. A composite unitary valve seat insert for a valve having inlet and outlet flow passages and a flow controlling gate, comprising a pair of resilient sealing ring portions connected around a portion of their circumference by an integral bridge portion, a rigid reinforcing member bonded to the outer surface of the bridge portion, the lateral edges of said member being substantially flush with the lateral edges of said insert, the ends of said bridge portion projecting beyond the ends of said reinforcing member, and means providing vent openings in the projecting portions of said bridge portion.

3. A valve comprising a body having flow passages intersecting at their inner ends an enlarged central cavity, a flow controlling gate movable into and out of said cavity between closed and open positions, removable annular wear rings carried by said body and surrounding the inner ends of said flow passages, a composite metal-elastomer sealing insert removably mounted in said cavity between said wear rings, said inert having a resilient bridge portion, said bridge portion having an upper surface against which said gate seals when said gate is moved to closed position, a metallic reinforcement member bonded to the lower surface of said bridge portion and extending completely across said cavity between said wear rings to hold said wear rings in position throughout opening and closing movements of said gate, and said reinforcement member being formed on essentially the same radius as said wear rings to thereby engage said wear rings around a substantial portion of their periphery, and mean providing pressure equalizing passages in said bridge portion.

References Cited by the Examiner

UNITED STATES PATENTS

| 2,401,123 | 5/1946 | Volpin | 251—327 X |
| 2,731,231 | 1/1956 | Garrott | 251—328 |
| 3,071,343 | 1/1963 | Milleville | 251—175 |
| 3,107,685 | 10/1963 | Scaramucci | 251—328 X |

M. CARY NELSON, *Primary Examiner.*

A. ROSENTHAL, *Assistant Examiner.*